Figure 6:
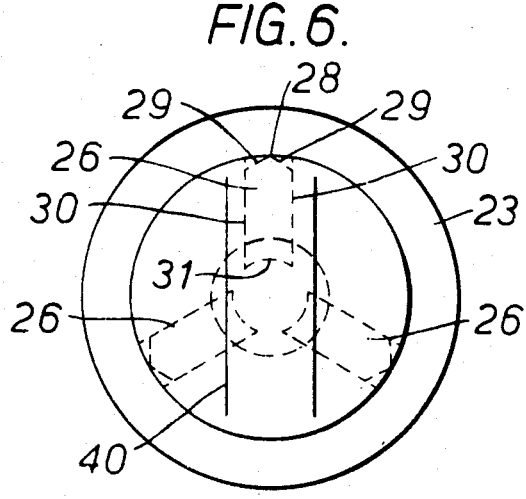

United States Patent [19]

Streatfield et al.

[11] Patent Number: 4,505,302
[45] Date of Patent: Mar. 19, 1985

[54] REPLACEMENT OF MAINS

[75] Inventors: Roy Streatfield, Bilsborrow, Nr. Preston; Francis D. Wilson, Blackburn, both of England

[73] Assignee: British Gas Corporation, London, England

[21] Appl. No.: 460,005

[22] Filed: Jan. 21, 1983

Related U.S. Application Data

[62] Division of Ser. No. 326,138, Nov. 30, 1981, abandoned.

[30] Foreign Application Priority Data

Dec. 2, 1980 [GB] United Kingdom ............... 8038655

[51] Int. Cl.³ .............................................. F16L 55/18
[52] U.S. Cl. ......................................... 138/97; 30/92; 30/92.5; 166/55.2; 225/103; 405/156; 405/184
[58] Field of Search ............... 138/97, 178; 405/156, 405/184; 225/93, 103; 30/92, 92.5; 166/55, 55.2, 55.3

[56] References Cited

U.S. PATENT DOCUMENTS

| 1,638,494 | 8/1927 | Lewis et al. | 166/55.1 X |
| 1,717,588 | 6/1929 | Small | 138/140 X |
| 3,005,493 | 10/1961 | Crowe et al. | 166/55 |
| 3,073,389 | 1/1963 | Conner | 166/55 X |
| 3,181,302 | 5/1965 | Lindsay | 405/156 |
| 3,543,377 | 12/1970 | Bremner | 138/97 X |

Primary Examiner—James E. Bryant, III
Attorney, Agent, or Firm—Larson and Taylor

[57] ABSTRACT

A mole 1 for replacing an existing main, for example a cast iron gas main, with a new main. The mole 51 is of steel and is inserted into and along the existing main 94. The mole 51 has a front portion comprising a head 52 and a cylindrical body portion and a rear portion 53 having a clamp 54 for clamping a new main to the mole 51. The head 52 has a cutting face 55 for engaging the internal wall of the existing main 94 so as to cause the wall to fracture as the mole 51 moves therealong. The new main which in use is clamped to the mole 51 is towed along behind the mole 51 to replace the fractured old main 94.

10 Claims, 10 Drawing Figures

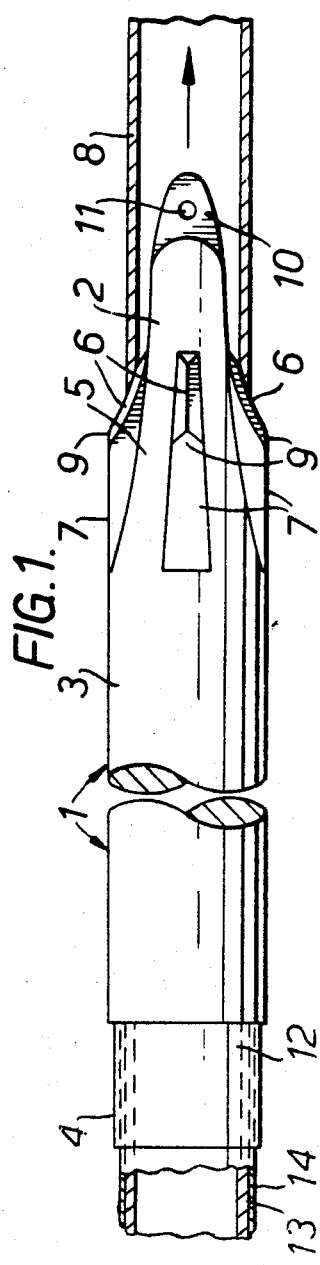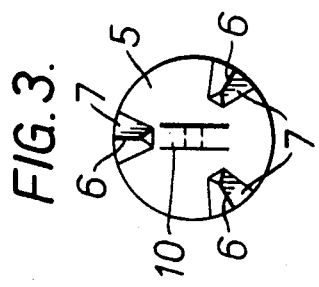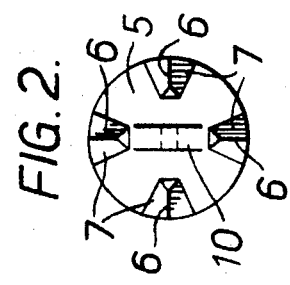

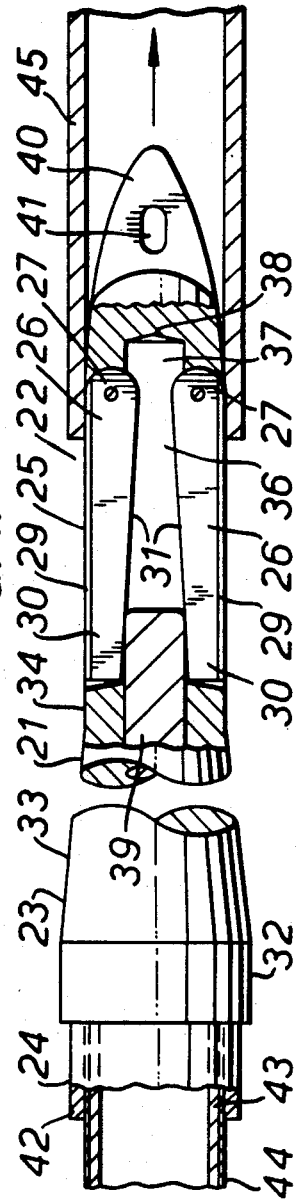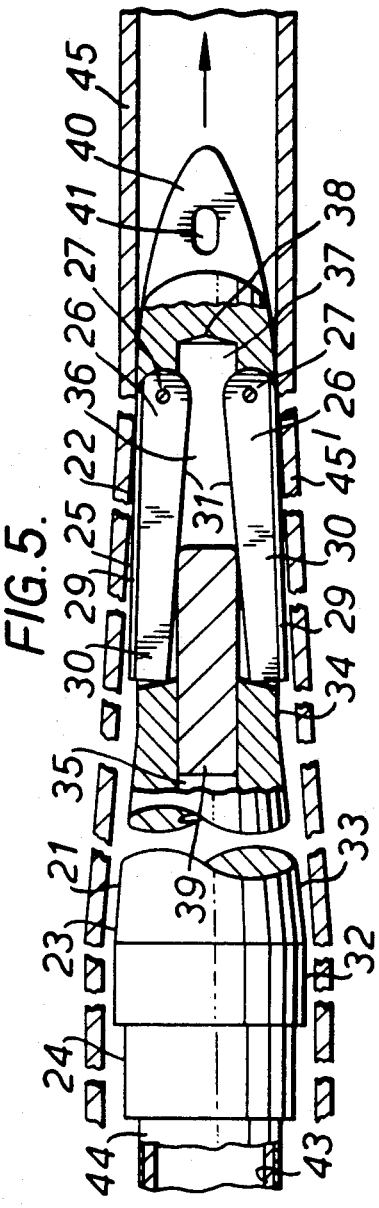

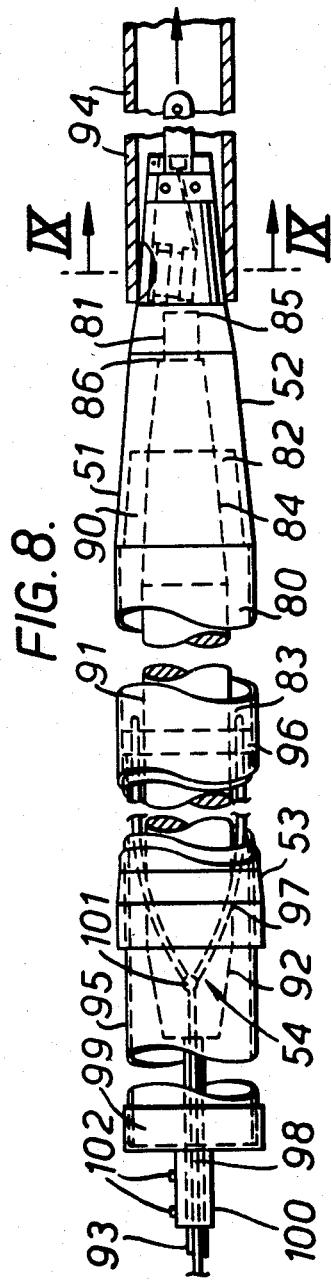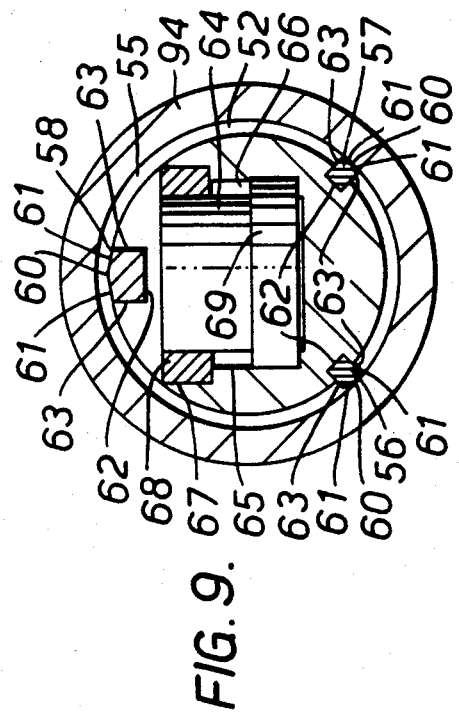

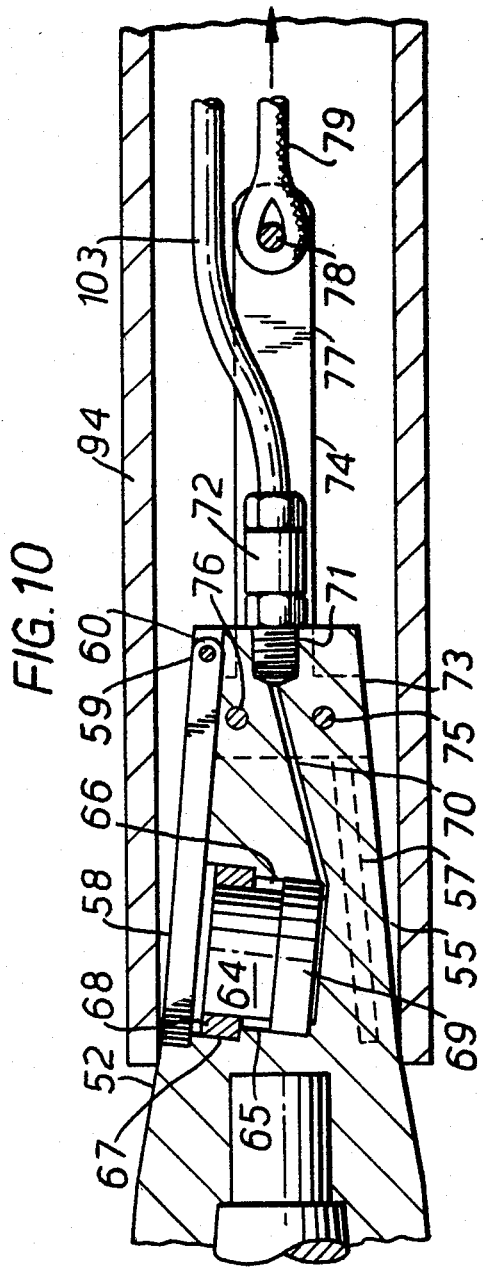

REPLACEMENT OF MAINS

This is a division of application Ser. No. 326,138 filed Nov. 30, 1981, now abandoned.

The present invention relates to the replacement or the preparation for replacement of an existing main, particularly an existing cast iron gas main, with a new main and is particularly concerned with a method and a device for enabling this replacement to be carried out.

Mains have to be replaced for a number of reasons, for instance, the existing main may be in poor condition or the existing main may not be of sufficient capacity to accomodate a modified load.

The usual means of replacing a gas main involves the use of costly and labour intensive total excavation of the surrounding ground. Alternatively, if total excavation is avoided and the new main is merely inserted into the existing main, it will, by necessity, be of smaller internal diameter than the existing main and thus will be of smaller gas carrying capacity.

It is an object of the present invention to enable an existing main to be replaced or prepared for replacement by a new main without any of the above disadvantages.

In one embodiment of the invention the new main is presleeved with the liner before the new main is moved through the fractured main.

Suitably the existing main is continuously fractured ahead of the moving new main or liner.

Conveniently the internal diameter of the new main is equal to or greater than the internal diameter of the existing main.

Preferably the clearance provides a bore whose diameter is greater than the external diameter of the existing main.

Suitably the clearance provides a bore whose diameter is greater than the external diameter of the new main or the liner.

According to another aspect of the present invention a device is provided for replacing or preparing for replacement an existing main with a new main, the device comprising a mole for insertion into and movement along the existing main, the mole having a front portion provided with a cutting face for engaging the internal wall of the existing main and arranged to cause the wall to fracture and a rear porion provided with means for clamping to the mole the new main or a liner for the existing main so that the mole tows the new main or the liner through the fractured main as the mole moves therethrough.

Preferably the front portion comprises a head portion provided with a cutting face and a body portion of at least the same diameter as the largest diameter of the head portion.

Suitably the forward end of the mole is adapted for connection to a cable of a winch.

In one embodiment of the invention the cutting face comprises edges on the head portion of the mole which edges are adapted to engage and fracture the wall of the existing main as the mole moves therethrough.

In this case the cutting face preferably tapers radially inwardly in the direction of the front end of the mole.

The cutting edges may comprise blades, one of which is moveable radially outwardly from the mole to engage and fracture the wall of the existing main.

Preferably the cutting edges lie in an axial plane of the mole.

Ideally the movable blade is pivotally mounted on the mole.

In this case movable means located within the mole may be provided to engage the movable blade to cause the movable blade to pivot.

Only one blade is pivotally movable and the movable means comprises an hydraulically actuated piston.

In this case the mole may be provided with a duct for supplying hydraulic fluid to the piston, the duct extending into the mole from its forward end.

To impart movement to the mole, means are preferbly located within the mole for driving the mole through the existing main.

Suitably the driving means comprises a pneumatically actuated hammer for engaging the mole to drive it percussively through the existing main.

Conveniently the hammer is located within a bore in the mole.

Figure 7:
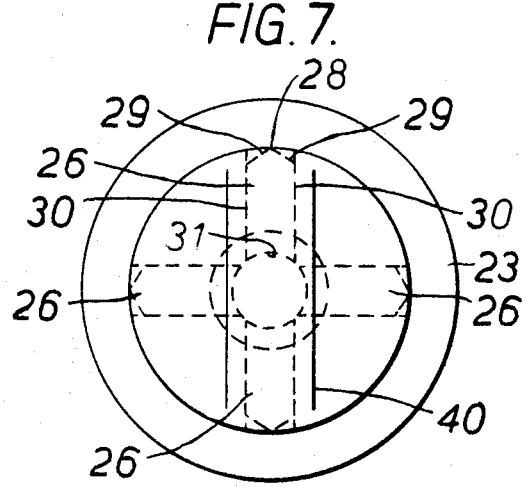

An embodiment of the invention will now be described with reference to the accompanying drawings in which the embodiments of FIGS. 1-7 illustrate background developments leading up to my invention, while FIGS. 8-10 illustrate an embodiment of my invention:

FIG. 1 is a side view of a first embodiment of the mole shown in use,

FIG. 2 is an end view of the mole cutting face shown in FIG. 1 and having four cutting edges, FIG. 3 is an end view of the mole cutting face shown in FIG. 1 and having three cutting edges, FIG. 4 is a side view partly in section of a second embodiment of the mole shown at the commencement of operation, FIG. 5 is a view of the mole shown in FIG. 4 during operation, FIG. 6 is an end view of the mole cutting face shown in FIGS. 4 and 5 and having three cutters shown in hidden detail and FIG. 7 is an end view of the mole cutting face shown in FIGS. 4 and 5 and having four cutters shown in hidden detail.

FIG. 8 is a side view of a third embodiment of the mole shown in use and broken away in part to reveal internal detail, FIG. 9 is a view along the lines IX—IX of FIG. 8 and FIG. 10 is a close up view of the front of the mole partly in section.

Referring to the FIGS. 1 to 3, FIG. 1 shows a steel mole 1 having a front portion consisting of a head portion 2 and a cylindrical body portion 3 and a rear portion having clamping means 4 for clamping a new main.

The head portion 2 has a cutting face 5 comprising three or more cutting edges 6 formed by grinding high tensile steel cutters 7 (four cutters are shown in FIGS. 1 and 2). The cutters 7 are housed in Keyways (not shown) in the head portion 2, which is in the form of a cylinder tapering towards the front end of the mole, the cutters 7 being attached to the head portion 2 by means of bolts (not shown) so that the cutters 7 are removable from the head portion 2. The cutting face 5 tapers radially inwardly in the direction of the forward end of the mole 1, that is, the radii of the cutting edges 6 decrease towards the forward end of the mole 1 so as to enable the cutting face 5 to exert a continuously increasing cutting action on the existing main 8 as the mole 1 moves therethrough.

The cutting face 5 terminates at rearward points 9 on the head portion 2, which points 9 are concentrically aligned with the periphery of the body portion 3 and the keyways are arranged on the head portion 2 so that the cutters 7 and their cutting edges 6 in position on the mole 1 lie in an axial plane of the mole 1.

The front end of the head portion 2 is provided with a housing 10 cast into the head portion 2 and provided with an eye 11 to enable the mole 1 to be connected to a steel winch cable (not shown).

The rear portion of the mole 1 is provided with a clamping means 4 in the form of a sleeve 12 secured to the body portion 3 and being of slightly smaller external diameter than that of the body portion 3. The sleeve 12, in use, receives the end of the new main 13 which is of a flexible material such as plastics. The end of the new main 13 is first surrounded by a protective plastics sleeve 14 and the main 13 and sleeve 14 are pushed into the clamping sleeve 12. This is arranged to have an internal diameter approximately equal to the external diameter of the new main 13 so that this fits securely within and is tightly gripped and clamped by the clamping sleeve 12.

The cutters 7 are arranged to be spaced equianguarly around the axis of the cutting face 5 as shown in FIGS. 2 and 3 and the taper of the cutting face 5 prevents the mole 1 from twisting and turning on its horizontal axis thereby preventing undue strain on the new main and associated pneumatic feedlines (not shown).

In use the ground at either end of the existing cast iron main 8 is evacuated to expose those ends. The steel cable of a motorised winch is fee through the main 8 from one end and is secured to the shackle housing 10 via the eye 11. The new plastic main 13 and its sheath 14 are then clamped to the clamping sleeve 12. The new plastics main 13 can be of the same or slightly larger internal diameter than the existing cast iron main 8. The head portion 2 of the mole 1 is then inserted into the existing cast iron main 8 until the cutting edges 6 engage the end of the main 8 as shown in FIG. 1.

The cable is then wound onto the winch so as to pull the mole 1 through the existing main 8. At the same time the rear portion 12 is acted upon by a pneumatic hammer (not shown) to drive the mole 1 into the main 8. The combined tension and pneumatic pressure cause the mole 1 to move along the main 8 so that the cutting edges 7 engage the internal wal of the main 8 and cause the wall to fracture due to their intense localised pressure on the wall as the mole 1 moves therethrough. The cylindrical body 3 widens out the internal diameter of the fractured main 8 since, in use, the body 3 is selected to have a diameter greater than that of the original internal diameter of the main 8. The body 3 also prevents debris from the fractured main and earth from falling into the pathway created for the new main. As the mole 1 proceds along the now fractured main 8 it tows the new main 13 and its associated sheath 14 with it, the internal diameter of the new main 13 being equal to or slightly larger than that of the existing main 8. When the new main 13 is finally in position, the new main 13 and its sheath 14 are removed from the clamping sleeve 12.

As a general rule the outer diameter of the body portion 3 of the mole 1 is arranged to be about ⅛" greater than the outer diameter of the existing main and the outer diameter of the clamping sleeve 12 is about ⅛" less in diameter than that of the cylindrical body portion 3 of the mole 1.

Referring to FIGS. 4 to 7, FIG. 4 shows a steel mole 21 having a front portion consisting of a head portion 22 and a body portion 23 and a rear portion having a clamping means 24 for clamping a new main.

The head portion 22 has a cutting face 25 comprising three or more pivotally mounted cutting blades 26 (four are present on the mole shown in FIGS. 4 and 5). The blades 26 are disposed in elongated axially directed slots (not shown) in the wall of the head portion 23 and are pivotally mounted at their forward ends 27 to the wall of the head portion 23.

Referring to FIGS. 6 and 7 the blades 26 are arranged to be spaced equiangularly around the axis of the cutting face. Each blade 26 has a cutting edge 28 formed by two sloping sides 29, two parallel sides 30 adjoining the sloping sides 29 and a concave side 31 distal from the cutting edge 28 between the parallel sides 30.

Referring to FIGS. 4 and 5 the concave side 31 slopes away from the cutting edge 28 in a direction forwardly of the mole 21.

The body portion 23 has a cylindrical rear portion 32, a frustoconical portion 33 tapering forwardly of the mole and a cylindrical front portion 34 adjoining the slot forming walls (not shown) of the head portion 23.

The body portion 23 is provided with a circular centrally located through-going bore 34 (see FIG. 5) which merges with a pssageway 36 formed by the concave sides 31 of the blades 26 and the internal concave shaped walls (not shown) of the head portion slot forming walls. The passageway 36 merges with a circular centrally located through-going bore 37 located near the forward end of the head portion 23 beyond the pivotted ends 27 of the blades 26. The bore 27 is provided with a conical termination 38.

The bore 35 and passageway 36 house an hydraulically operated cylindrical ram 39 which is capable of movement within the bore 35 and passageway 36. The front of the ram 39 is engaged at all times with the concave sides 31 of the blades 26. When the blades 26 are in the closed position shown in FIG. 4 the cutting edges 28 are axially aligned with the front portion 34 of the body portion 23. The concave sides 31 of the blades 26 extend further radially into the passageway 36 than do the internal concave shaped walls of the head portion slot forming walls (not shown) so as to permit the blades 26 to pivot outwardly from the closed position in FIG. 4 to the open position in FIG. 5 as the ram 39 is moved forwardly along the passageway 36 and encounters the radially inward slope of the concave sides 31.

The front end of the head portion 22 is provided with a housing 40 and an eye 41 similar to that shown in the mole of FIG. 1 and for similar purposes.

The rear portion of mole 21 is provided with a clamping means 24 in the form of a clamping sleeve 42 similar to that shown in the mole in FIG. 1. As in that mole, the clamping sleeve 42 is secured to the body portion 23 and is of slightly smaller diameter than the rear portion 32 of the body portion 23. The new plastics main 43 and its protective sheath 44 are secured and clamped to the clamping sleeve 42 in exactly the same manner as previously described for the mole shown in FIG. 1.

In use, as with the mole described in FIG. 1, the ground at either end of the existing cast iron main 45 is evacuated to expose those ends. The steel cable of a motorised winch is fed through the main 45 from one end and is secured to the housing 40 via the eye 41. The new plastics main 43 and its sheath 4 are then clamped to the clamping sleeve 42. The new plastics main 43 can be of the same or slightly larger internal diameter than the existing cast iron main 45. The head portion 22 of the mole 21 is then inserted into the existing main 45 until a portion at least of th cutting blades 26 lie adjacent the internal wall of the existing main 45 as shown in FIG. 4. The ram 39 is actuated hydraulically to move forwardly within the passageway 36 to cause the blades 26 to pivot about their ends 27 to engage and fracture the cast iron main 45 by the intense localised pressure of their cutting edges 28 upon the internal wall of the main 45 as shown in FIG. 5. After a portion of the main 45 has ben cracked open the ram 39 is withdrawn to the position shown in FIG. 4 so that the blades 26 return to the closed position of FIG. 4. The winch cable (not shown) is then wound into the winch so as to pull the mole 21 through the existing main 45 by an amount not exceeding the length of the blades 26. A next portion of the existing main 45 is then fractured by the method just described and the mole 21 is then pulled through the main 45 by a further amount not exceeding the length of blades 26. This process is repeated until the entire length of the existing main 45 has been fractured. As the mole 21 moves through the fractured main 45 the body portion 23 widens out the internal diameter of the fractured main 45 since, in use, the rear portion 32 of the body portion 23 is selected to have a diameter greater than that of the original internal diameter of the cast iron main 45.

The body portion 23 also prevents debris from the fractured main 45 and earth from falling into the pathway created for the new main 43. As the mole 21 proceeds along the fractured main 45, it tows the new main 43 with it the internal diameter of the new main 43 being the same or slightly larger than that of the existing main 45. When the new main 43 is finally in position, the new main 43 and its sheath 44 are removed from the clamping sleeve 42.

Referring to FIG. 8, the steel mole 51 comprises a front portion consisting of a head 52 tapering generally conically towards its front end and a cylindrical rear portion 53 incorporating clamping means 54 for clamping a cylindrical liner for the new main.

As shown more clearly in FIGS. 9 and 10 the head portion 52 has a cutting face 55 comprising three blades 56, 57 and 58 disposed in elongated axially directed slots in the wall of the head 52. Two lower blades 56 and 57 (shown in FIG. 9) are welded or bolted rigidly in the slots so that they are fixed.

The other upper blade 58, which is wider and thicker than the lower blades, is pivotally mounted at its forward end 59 to the wall of the head portion 52.

The upper blade 58 pivots on a pin 60 extending through portions (not shown) of the head 52 of the mole 51, the portions forming a recess (not shown) to accommodate movement of the forward end 59 of the blade 58.

As shown in FIG. 9, the blades 56 to 58 are spaced equiangularly around the axis of the cutting face which tapers forwardly to the front end of the mole 51. Each blade 56 to 58 has a cutting edge 60 formed by two sloping sides 61 and a base 62 distal from the cutting edge 60 and formed between parallel sides 63.

Referring to FIGS. 9 and 10 the head 52 of the mole 51 houses an hydraulically actuated piston 64 slidable within a cylindrical bore 65 within the head 2. The bore 65 has a smaller diameter lower bore portion 66 communicating with a wider diameter upper bore portion 67. The wall of the bore portion 67 is screw threaded for receiving an externally threaded stop ring 68. The stop ring 68 serves to limit the extent of upward movement of the piston 64 when it engages with a lowermost stop collar 69 secured to the periphery of the piston 64.

As shown in FIGS. 8 and 10 the head 52 is provided with a hydraulic fluid channel 70 which at one end communicates with the bore 65 below the piston 64 and terminates in a threaded bore 71 of wider diameter at the front end of the head 52. The threaded bore 71 serves to receive the threaded connector of a hydraulic hose coupling 72.

While not shown, the front end of head 52 is recessed laterally on two sides to receive and engage the crosspieces 73 of two adjacent T-shaped cable connecting plates 74 (only one plate 74 shown in the drawings). The plates 74 are connected to each other and to the front end of the head 52 by a pair of connecting pins 75 and 76 which extend through the cross-pieces 73 of the plates 74 via the front end of the head portion 52. The uprights 77 of the connecting plates 74 extend forwardly of the mole 51 and are connected together by a pin 78 which also forms a connectng point for the cable 79 of a winch (not shown).

Referring to FIG. 8, the rear 53 of the mole 51 comprises a generally hollow cylinder adjoining the conically tapering mole head 52. The mole 51 forms a housing for a pneumatically actuated hammer device 80.

The hammer 80 has head portion 81 projecting into an internal bore 82 formed in the head 52 of the mole 51, the rear 83 of the hammer 80 being axially disposed with clearance in the cylindrical rear portion 53 of the mole 51.

The head portion 81 of the hammer 80 comprises a forwardly conically tapering portion 84 terminating in a cylindrical end 85. The diameter of the end 85 is less than the diameter of the adjoining end of the conically tapering portion 84 so that there is an annular shoulder 85 formed between the portion 84 and the hammer end 85.

As shown in FIG. 8 the portion 84 and the end 85 of the hammer head 81 are, in use, able to cooperatively engage in corresponding portions of the internal bore 82, these portions also forming an annular shoulder for co-operation with the annular shoulder 86 in the hammer head 81. A rear part of the hammer head portion 84 is disposed axially with clearance in a wider forwardly conically tapering portion 90 of the internal bore 82, the portion 84 terminating within the rear 53 of the mole 51.

The rear 83 of the hammer 80 comprises a cylindrical portion 91 terminating in a rearwardly tapering conical portion 92 which is provided with a coupling (not shown) for an air hose 93.

In use, compressed air supplied to the hammer 80 through the hose 93 causes the hammer 80 to reciprocate in the conventional manner to drive the mole 51 through the existing main 94 by the percussive action of the hammer head 81 upon the corresponding co-operating portions of the internal bore 82 of the hole 51.

The means 54 for clamping the liner 95 to the mole 51 comprises a steel ring 96 for engaging the rear end of the liner 95, a looped cable 97 connected to the ring 96, a tensioning cable 98 connected to the cable 97, a clamping cup 99 for engaging the far end of the liner 95 and a locking device 100 for locking the cable 98 immovably against the cup 99.

The steel ring 96 is sedured as by welding within and to the internal wall of the rear portion 53 of the mole 51. The ring 96 is formed with holes (not shown) to enable the ends of the looped steel cable 97 to be secured thereto.

The clamping cup 99 which is also of steel is adapted to receive and locate the far end of the liner 95 and is apertured (not shown) for the passage therethrough of the air hose 93 and of the tensioning cable 98.

The tensioning cable 98 which is also of steel, is coupled by a conventional hitch 101 at one end to the looped cable 97 and is connected via its other end to a winch (not shown).

The locking device 100 comprises a clamping block which has an axial bore therethrough for permitting the block to be slidable on the tensioning cable 98 and screws 102 for clamping the block to the cable 98.

In use of the mole 51, as with the moles previously described the ground at either end of the existing cast iron main 94 is excavated to expose the ends of the main 94. The steel cable 79 of a motorised winch is then fed through the main 94 from one end and is secured to mole 51 located at the other end of the main 103. The cable 79 is connected to the clamping plates 74 by way of the clamping pin 78. Next the hydraulic hose 103 is fed through the same end of the main 94 as the cable 79 and is coupled to the fluid bore 71 in the mole head 52 by way of the hose coupling 72.

In the next stage, the liner 95 is clamped to the mole 51. Initially, the looped cable 97 is secured to the ring 96 and the cable 97 is then secured to the tensioning cable 98 which has the clamp block 100. The liner 95 is then pushed up the cylindrical portion 53 of the mole 51 until one end of the liner 95 engages with the ring 96. The clamping cup 99 is then slid along the tensioning cable 98 and the air hose 93 until the other end of the liner 95 is located within and engages with the cup 99. The tensioning cable 98 is then tensioned by coiling it onto the winch and after the tension in the cable 98 is deemed to be sufficient, the clamping block 100 is slid along the cable 98 until it engages with the base of the cup 99 as shown in FIG. 8.

The screws 102 are then screwed into engagement with the tensioning cable 98 to clamp it securely against the clamping cup 99. The liner 95 is then clamped compressively between the clamping cup 99 and the ring 96. The tensioning cable 98 is now released from the winch.

As shown in FIGS. 8 and 10 the internal diameter of the liner 95 is greater than the internal diameter of the existing cast iron main 94.

The head portion 52 of the mole 51 is then inserted into the cast iron main 103 until the cutting edges 60 of the blades 56, 57 and 58 engage the end of the main 103 as shown in the drawings. The pneumatic hammer 80 is actuated by supplying compressed air to its rear end by way of the air hose 93 so that the hammer 80 percussively drives the mole 51 through the main 94.

Simultaneously the mole 51 is drawn through the main 94 by the cable 79 which serves to guide the mole 51 axially through the main 94.

As the mole 51 moves through the main 103 the cutting edges 60 engage the internal wall of the main 94 and cause it to fracture. Since the cylindrical portion 53 of the mole 51 has a greater external diameter than the internal diameter of the main 94, the internal diameter of the fractured main 94 is widened out. The body 53 of the mole 51 also serves to provide clearance for the passage of the liner 95 therethrough and prevents debri from the fractured main and earth from falling into the pathway created for the liner 95.

Should the mole 51 encounter an obstruction in the main 94, such as a flange which narrows the internal diameter of the main 94, the movable blade 58 is pivotted outwardly to fracture the obstruction and provide a clearance for the liner. In this case hydraulic fluid is pumped to the piston 64 via the hose 103, duct 70 and the cylinder bore 65. The fluid pressure is relaxed immediately after the obstruction has been fractured so that the piston 64 relaxes and the blade 58 returns to its closed position. The hose 103 is of course moved simultaneously forward with the mole 51.

The liner 95 is pushed through and out of the main 103 after complete fracture thereof to expose the clamping cup 99 and block 100.

Finally the mole 51 together with the associated clamping means 53 are removed from the liner 95. The new main (not shown) may then be pushed manually or otherwise through the liner 95 which therefore forms a protective sleeve for the new main.

The new main may be of any convenient plastics material such as polyethylene or pvc while the liner is of a much tougher wear resistant plastics material.

We claim:

1. A device for replacing or preparing for replacement an existing main with a new main, the device comprising a mole for insertion into and movement along the existing main, the mole having a front portion comprising a head portion provided with a cutting face for engaging the internal wall of the existing main and arranged to cause the wall to fracture and a rear portion provided with means for clamping to the mole the new main or a liner for the bore created by the mole as it moves through the fractured main so that the mole tows the new main or the liner through the fractured main as the mole moves therethrough, said cutting face comprising a plurality of blades positioned on the head portion to engage and fracture the wall of the existing main as the mole moves therethrough, all except one of the blades being fixedly mounted on the head portion, said one blade being pivotally mounted on the mole, movable radially outwardly from the mole to engage and fracture the wall of the existing main, and including movable means within the mole to engage said one movable blade to cause it to pivot.

2. A device according to claim 1, including a total of at least three blades.

3. A device according to claim 1, said movable means comprising a hydraulically actuated piston.

4. A device according to claim 3, in which the mole is provided with a duct for supplying hydraulic fluid to the piston, the duct extending into the mole from its forward end.

5. A device according to claim 1, in which means are located within the mole for driving the mole though the existing main.

6. A device according to claim 5, in which the driving means comprises a pneumatically actuated hammer for engaging the mole to drive it percussively through the existing main.

7. A device according to claim 6, in which the hammer is located within a bore in the mole.

8. A device according to claim 1, wherein the mole includes a body portion of at least the same diameter as the largest diameter of the head portion.

9. A device according to claim 1, in which the cutting face tapers radially inwardly in the direction of the front end of the mole.

10. A device according to claim 1, in which the cutting edges lie in an axial plane of the mole.

* * * * *

UNITED STATES PATENT AND TRADEMARK OFFICE
CERTIFICATE OF CORRECTION

PATENT NO. : 4,505,302

DATED : March 19, 1985

INVENTOR(S) : Streatfield et al.

It is certified that error appears in the above—identified patent and that said Letters Patent is hereby corrected as shown below:

On the front page of the patent, please correct the listing of the inventors to read as follows:

[75] Inventors: Roy Streatfield, Bilsborrow, Nr. Preston, Lancashire; Francis D. Wilson, Blackburn, Lancashire and Roger England, Clitheroe, Lancashire, all of England Signed and Sealed this Fourteenth Day of October, 1986

[SEAL]

Attest:

DONALD J. QUIGG

*Attesting Officer*     *Commissioner of Patents and Trademarks*